June 4, 1963

B. E. FRANK 3,091,848

METHOD OF MAKING MULTI-WALLED TUBING

Filed Sept. 18, 1958

INVENTOR.
Bernard E. Frank
BY
G. M. Shampo
ATTORNEY

June 4, 1963

B. E. FRANK 3,091,848

METHOD OF MAKING MULTI-WALLED TUBING

Filed Sept. 18, 1958

INVENTOR.
Bernard E. Frank
BY
G.N. Shampo
ATTORNEY

June 4, 1963 B. E. FRANK 3,091,848
METHOD OF MAKING MULTI-WALLED TUBING
Filed Sept. 18, 1958 3 Sheets-Sheet 3
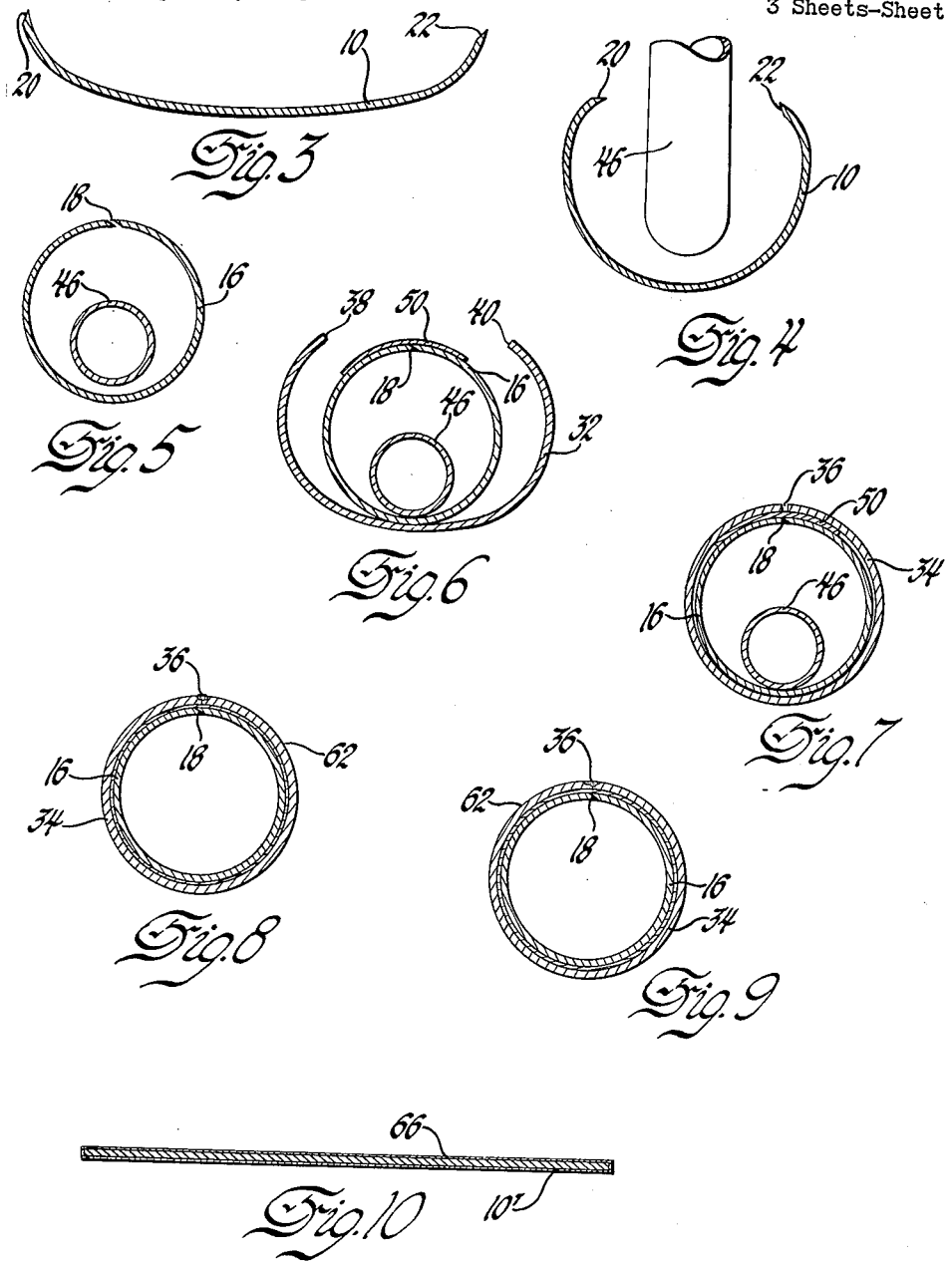
INVENTOR.
Bernard E. Frank
BY
ATTORNEY

United States Patent Office 3,091,848
Patented June 4, 1963

3,091,848
METHOD OF MAKING MULTI-WALLED TUBING
Bernard E. Frank, Rochester, N.Y., assignor to General Motors Corporation, Detroit, Mich., a corporation of Delaware
Filed Sept. 18, 1958, Ser. No. 761,749
4 Claims. (Cl. 29—471.7)

This invention relates to the manufacture of steel tubing in which the primary objects of the invention are to provide a multi-wall steel tubing having concentric walls which are brazed to one another and a welded outer seam and to provide a continuous method of making such a tubing.

This invention comprehends making a composite multi-walled steel tubing from flat strips of steel which are formed and brazed together during the manufacturing of the tubing. A steel strip is continuously moved longitudinally through a tube-forming mill which transversely bends it into a tubular configuration having longitudinally abutting edges. A second steel strip is then continuously moved longitudinally along with the tubing formed from the first steel strip. The second strip is then similarly transversely bent around the tube to form a composite tubing of an inner tube and a concentric outer, larger diameter, tube. Prior to the complete formation of the outer tubing, a brazing material is progressively introduced into the composite tubing between the inner and outer tubes. When the formation of the outer tube is complete, its abutting edges are welded to form a closed imperforate seam. The tubing is then passed through a series of rolls in which the outer tube is roll reduced into an intimate circumferential contact with the adjacent outer surface of the inner tube. The composite tubing is then sized and heated to a suitable temperature to liquefy the brazing material which was deposited interjacent the individual tubes during formation of the tubing. The molten brazing alloy migrates throughout the tubing and metallurgically bonds the contacting surfaces of the two tubes and similarly joins the abutting edges of the inner tube. The hot tubing is annealed and subsequently cooled whereupon the brazing material solidifies. In order to inhibit deleterious oxidation during the heating and cooling steps, it is desirable to provide a non-oxidizing atmosphere during the heating and cooling of the tubing.

Further objects, features and advantages of the present invention will become more apparent from the following description of preferred embodiments thereof and from the drawings, in which:

FIGURE 3 shows an enlarged sectional view along the line 3—3 of FIGURE 1;

FIGURE 4 shows a similar view along the line 4—4 of FIGURE 1;

FIGURE 5 shows another sectional view along the line 5—5 of FIGURE 1;

FIGURE 6 shows still another enlarged sectional view along the line 6—6 of FIGURE 1;

FIGURE 7 shows an enlarged view in section along the line 7—7 of FIGURE 1;

FIGURE 8 shows a similar view along the line 8—8 of FIGURE 1;

FIGURE 9 shows an enlarged sectional view along the line 9—9 of FIGURE 1; and

FIGURE 10 shows an enlarged sectional view along the line 10—10 of FIGURE 2.

Figure 1:
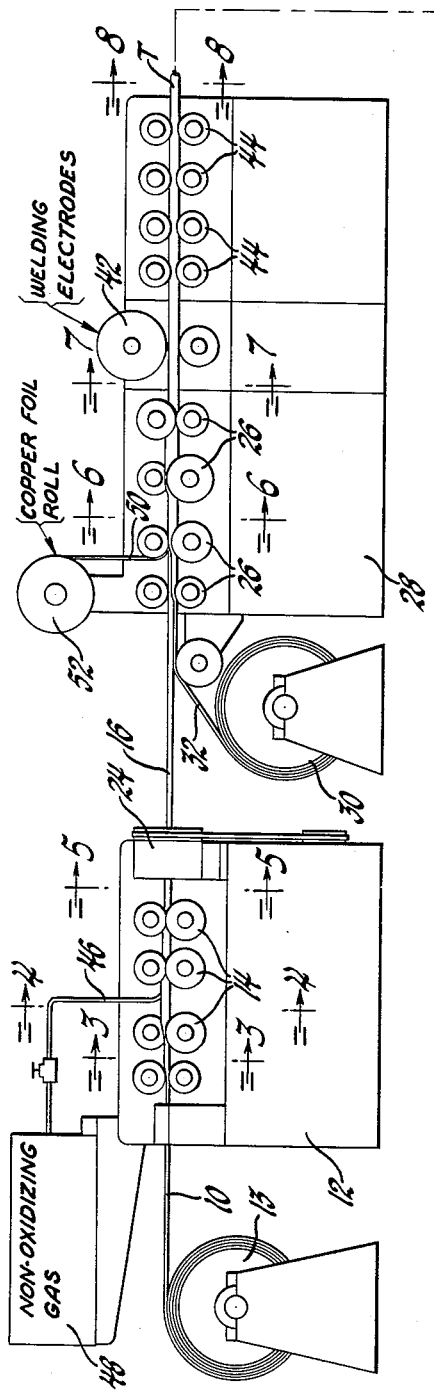
FIGURE 1 is a diagrammatic view showing a tube-forming mill provided with suitable apparatus for carrying out the present invention.
Figure 1:
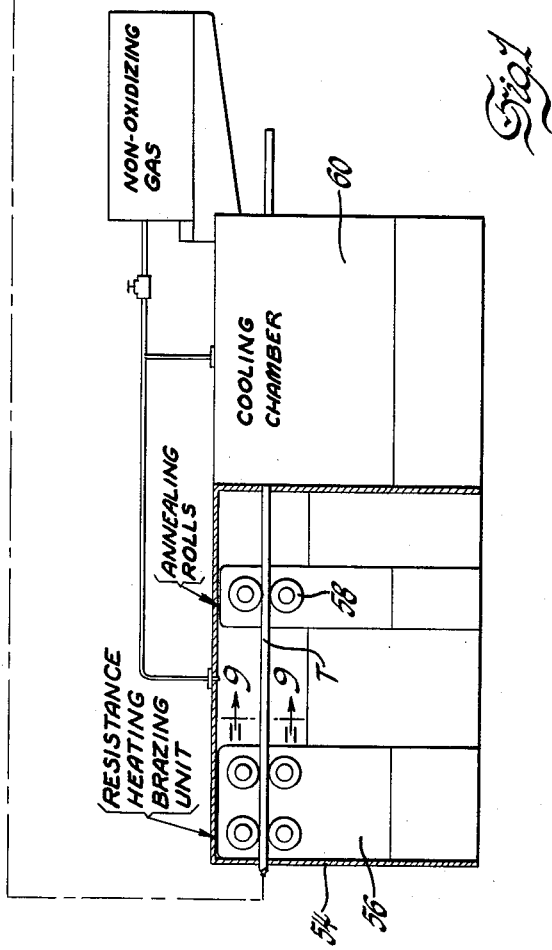

Referring now to FIGURE 1, the tubing is formed from two flat steel strips of AISI 1010, AISI 1020, and AISI 1008 or the like which extend from generally radially aligned reels adjacent a tube-making apparatus. A first steel strip 10 is coiled on a reel 13 which is positioned at one end of a tube-forming mill 12. The tube-forming mill 12 is composed of a group of forming devices 14 each of which includes a pair of rolls. A sufficient number of forming devices are included in the forming mill to impart the desired cross sectional configuration to the flat steel strip 10. These rolls progressively bend the edges of this flat steel strip upwardly to form a tube having an open seam 18 at its top where the edges 20 and 22 of the steel strip abut. The formed tube 16 then passes through a swaging device 24 which further imparts the desired cross sectional configuration to the tube 16.

The tube 16 formed on the first mill 12 then passes between the forming devices 26 of a second tube-forming mill 28 which is spaced somewhat from the end of the first tube-forming mill 12 opposite the reel 13 containing the first flat steel strip 10. The second tube-forming mill 28 is in general longitudinal alignment with the first so that the tube formed in the first tube-forming mill 12 passes directly into the forming devices 26 of the second tube-forming mill 28.

A second reel 30 containing another flat steel strip 32 wider than the first is positioned between the two tube-forming mills in general radial alignment with the first reel 13. The coiled flat steel strip 32 on the second reel 30 extends into the second tube-forming mill 28 where its edges are transversely bent upwardly to form a tubular configuration around the tube 16 formed from the first flat steel strip 10. The second tube-forming mill 28 thus progressively forms a composite concentric multi-walled tubing T in which the second strip 32 constitutes an outer tube 34 having an open seam 36 at the top where the edges 38 and 40 of the strip abut. In some instances the tubing T is preferably formed with the longitudinal seams 18 and 36 of the respective inner and outer tubes 16 and 34 diametrically opposed to inhibit simultaneous leak failures. The formed tubing T passes between suitable welding electrodes 42, such as are known and used in the art for these purposes, where the abutting edges 38 and 40 of the outer tube 36 are welded so as to form an imperforate or closed seam. The welded tubing T then passes between suitable sizing rolls 44 which rolls reduce the outer tube 34 into intimate circumferential contact with the inner tube 16 formed from the first steel strip 10.

At a point on the first mill 12 prior to the complete formation of the first or inner tube 16, a small diameter pipe 46 which carries a non-oxidizing gas enters the tube. This pipe, which is connected to a suitable reservoir 48 of a non-oxidizing gas, enters the inner tube 16 as it is formed on the first mill 12 and extends axially therein to a suitable point on the second mill 28.

Prior to the complete formation of the outer larger diameter tube 34 a thin foil 50 of brazing material is introduced interjacent the tubes 16 and 34. The foil is coiled on a suitable reel 52 on the second tube-forming mill 28 and is progressively introduced interjacent the two tubes immediately prior to the complete shaping of the second flat steel strip 32 as it is formed.

After the tubing T has been roll reduced to form a composite tubing in which the inner and outer tubes are in fairly intimate circumferential contact, the tubing is passed into a heating chamber 54. In the heating chamber the tubing is passed through a resistance heating brazing unit 56 where it is heated to a suitable temperature to liquefy the brazing material. The molten brazing material migrates throughout the circumference of the bonding interface and between the open longitudinal seam 18 on the inner tube. Thus, the outer tube 34 is circumferentially metallurgically bonded to the inner tube 16 while the longitudinal seam 18 on the inner tube 16 is simultaneously closed. The tubing T then passes through annealing rolls 58 within the heating chamber 54 and subsequently into a cooling chamber 60 where the molten brazing material is solidified.

A protective atmosphere is preferably maintained within the heating chamber 54 and a cooling chamber 60 to prevent oxidation of the outer surface 62 of the tubing T while the small diameter pipe 46 within the tubing provides a protective atmosphere therein to insure satisfactory brazing. Upon cooling the brazing material solidifies, permanently bonding the two tubes 16 and 34 together and brazing the longitudinal seam 18 on the inner tube 16. The tubing T can then be cut into whatever lengths are desired. If the tubing T is cut into extremely long lengths, it can be coiled on large rolls but if cut to short lengths it can be stored in straight pieces.

In some instances it may be desirable to clean the steel strips prior to formation of the tubes. The strip can be degreased in the usual way, as by means of suitable solvents, such as trichloroethylene or the like. After degreasing the steel strip, if it is severely rusted, it can be pickled in a suitable acid solution in the known and accepted manner for such cleaning, as by immersion in an aqueous solution containing 10% to 15% hydrochloric acid, by volume, for about 60 seconds. As shown in FIGURES 3 through 9, the flat steel strip 10 used to form the inner tube 16 preferably has its edges 20 and 22 scarfed to provide a lap joint where these edges longitudinally abut in the formed tube. The strip 10 can be scarfed prior to the tube-forming operation or be passed initially into a scarfing device (not shown) from the reel before introduction into the mill 12. It has been found that the lap joint is stronger and more uniformly provides a satisfactory seam under production conditions.

The flat steel strip 32 which forms the larger outer tube 34, of course, must be of a larger width than that of the flat steel strip 10 forming the inner tube 16. The preferred or optimum width of the strip 32 forming the larger tube 34 therefore is governed by the relative size of the inner tube which is to be circumferentially encased. In general, the second strip must have sufficient width to at least substantially encase the smaller diameter tubing in such a manner that its edges 38 and 40 can be brought sufficiently close together to enable them to be satisfactorily joined by welding. In most instances, it is desirable to bring these edges into general abutment.

The maximum width of the second steel strip 32 similarly is dependent upon the dimensions of the inner tube. The outer tube is preferably formed in a diameter which is sufficiently large to accommodate the interjacent foil 50 of bonding material yet of a small enough diameter to be readily roll reduced into intimate contact with the inner tube. Preferably then, as shown in FIGURES 6 and 7, the second strip is made only large enough to substantially form a tubular configuration around the foil and internal tube without excessive space therebetween. In such a construction the diameter of the large tube can readily be roll reduced to put the larger diameter tube into intimate circumferential contact with the inner tube. In the roll reducing operation the foil 50 interjacent the two tubes 16 and 34 is compressed and laterally expanded into an exceedingly thinner strip which facilitates distribution of the brazing material throughout the contacting surfaces of the two tubes.

In general, we have found that satisfactory results are obtained when the outer tube 34 is formed from a steel strip which is preferably between about 10% to 20% wider than the strip from which the inner tube is formed. However, in some instances, depending upon the nature of the materials, the relationship of thickness to diameter, etc., the steel strip 34 can be from 10% to 30% wider than the strip 10 used to form the inner tube 16.

My invention can be successfully practiced by introducing a suitable non-ferrous brazing material, such as copper or copper base alloys, in any convenient form into the interior of the larger tubing interjacent the two tubes. However, my invention is especially more conveniently practiced if the brazing material is introduced into the tubing as a thin foil 50, such as shown in FIGURES 1, 6 and 7. When using a brazing material in foil form it is preferred to introduce it interjacent the tubes immediately before the outer tube is fully formed. A strip of foil 50 from a reel 52 mounted on the second tube-forming mill serves as a source of supply of the brazing material in this modification of the invention. The specific construction of this supply mechanism is not a part of this invention and any suitable device can be used to introduce the brazing material at a substantially uniform rate.

The particular rate at which the brazing material is introduced is variable to some extent and is governed by the size and speed of movement of the tubing being formed. Satisfactory results have been obtained when a foil of suitable dimensions has been progressively introduced interjacent the tubes at a rate generally equal to the rate of movement of the tubing through the tube-forming apparatus.

The brazing material can also be introduced conveniently as a wire. As shown in United States patent application Serial No. 742,195, filed June 16, 1958, in the names of Isadore Caplan, Gerard T. Ruflin and Donald K. Van Zile, and assigned to the assignee of the present invention, a strand of wire from a coiled roll mounted on the tube-forming mill can be fed through a directing tube into the bonding area by means of a pair of driving rolls. Moreover, as shown in United States Patent No. 2,771,669, filed in the names of J. W. Armstrong, R. W. Spears and R. D. Williams and which is also assigned to the assignee of the present invention, particles of the brazing metal can also be introduced uniformly into the bonding area employing a suitable hopper or funnel having a narrow outlet above the inner tube at a point immediately prior to the complete formation of the outer tube.

In order to provide a uniform bonding of the concentrically disposed tubes to form a strong multi-walled composite tubing, the amount of copper or other metal which is introduced into the bonding interface or bonding area of the tubing will vary according to the size of the tubing being formed, the nature of the brazing material, strength requirement for the tubing, etc. Specifically, however, we have obtained satisfactory results in making ¼ inch outer diameter double wall tubing using a copper foil having a thickness of approximately 0.001 inch and a width of approximately 0.250 inch. We have also made 5/16 inch outer diameter double wall tubing using a copper foil having a thickness of 0.001 inch and a width of 0.350 inch.

Figure 2:
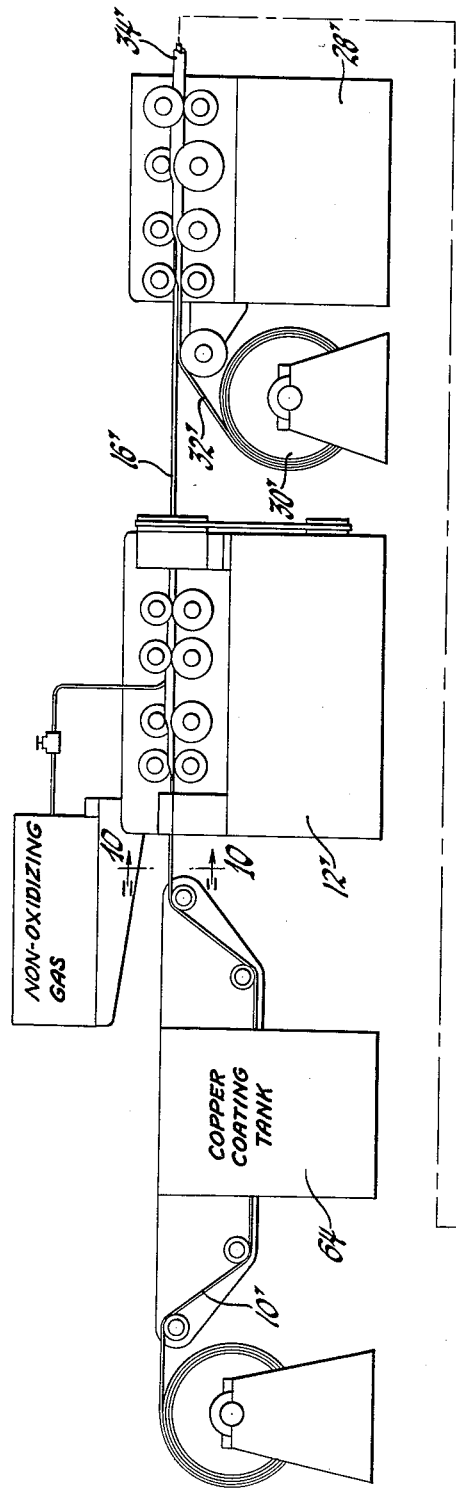
FIGURE 2 is a similar view showing another tube-forming mill provided with suitable apparatus for carrying out a modification of the invention.
Figure 2:
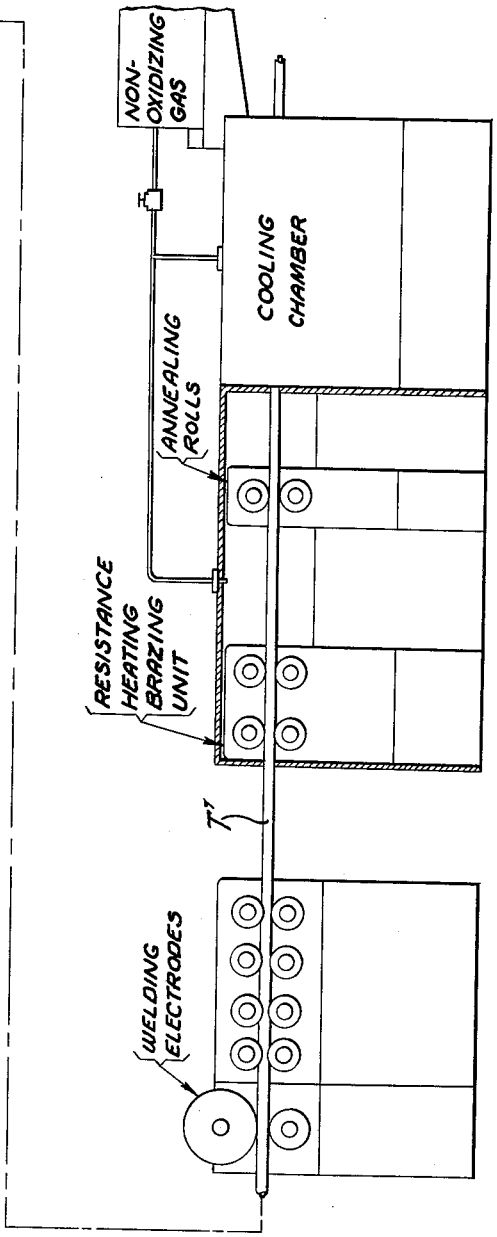

The brazing material can also be applied in a somewhat different manner, such as a coating on one of the steel strips. Referring now to FIGURE 2, an apparatus is shown in which the first steel strip 10' which forms the inner tube 16 is initially copper coated before it passes into the tube-forming mill 12'. The strip 10' is directly moved through a continuous copper coating device 64 such as a molten metal bath or electroplating bath, which places a copper coating 66 of a suitable thickness on the strip before it passes into the first tube-forming mill 12'. A copper coating of sufficient thickness is applied to the steel strip to permanently braze the two tubes 16' and 34' together when the composite tubing T' is subsequently heated to the brazing temperature. Although FIGURE 2 shows the brazing material being applied to the strip 10', in some instances it may be more desirable to coat the strip 32' instead. This may be particularly advantageous when a copper coating is desired on the outer surface of the tubing T'. In such instance the copper coating device 64 would be placed between the reel 39' and the second tube-forming mill 28' and the strip 32' coated before being formed. Moreover, in other instances it may be desirable to apply the brazing material to the formed inner tube 16' as it emerges from the first mill 12' and before it passes into the second mill 28'.

The particular manner in which the steel strip is coated prior to the forming operation is not particularly critical. This coating can be applied in any convenient manner, as by means of electrodeposition, immersion in molten baths, or any of the other methods of coating which are well known in the art. The preferred method of application, of course, is dependent upon the nature of the brazing material being applied, economy and ease of application, etc. The thickness of the coating applied will vary with the particular application of the invention but, in general, coating thicknesses of about 0.0003 inch to about 0.0008 inch can be used.

Although the invention has been especially satisfactory using copper as the brazing material, it is understood that copper base alloys, those alloys containing at least 50% copper, can also be used. Additionally, in some instances, other brazing materials of suitable metallurgical compatibility and melting temperature which produce sufficient joint strength, such as some aluminum alloys and certain solders, can also be used.

The composite tubing formed is directed to a heating chamber where the brazing material is liquefied. The molten brazing material migrates throughout the bonding interface and into the open seam of the inner tube to metallurgically bond the contacting surfaces. When using copper or copper base alloys, for example, it is preferred to heat the tubing to a temperature of about 1950° F. to 2250° F. However, it has been found that satisfactory copper or copper base alloy brazed steel tubes can be produced when the tubing is heated to a temperature ranging from about 1850° F. to 2400° F. Within the heating chamber the tubing is simultaneously annealed at about the brazing temperatures. In some instances, such as when using copper or copper base alloys, a simultaneous brazing and annealing can be effected in the heating chamber since the brazing temperatures used are generally similar to the annealing temperatures of steel. Thus, the heating operation can serve a two-fold purpose; namely, that of brazing and annealing.

From the brazing furnace the tubing passes through a cooling chamber which serves to solidify the brazing material. Continuously circulated cooling water in a jacket (not shown) which surrounds the tubing is one effective means by which the alloy brazing metals can be readily converted to the solid state. When the tubing is cooled, the brazing alloy solidifies rapidly inhibiting any tendency for the brazing material to accumulate at the bottom of the tubing.

As shown in FIGURES 4 through 7 a small diameter pipe extends within the formed inner tube. The pipe enters the inner tube at a point on the first tube mill just before the tube is completely formed, as shown in FIGURE 4. A non-oxidizing gas from a suitable reservoir passes through the small diameter pipe which has a part that preferably extends axially within the interior of the inner tube to a point beyond the welding device on the second mill. In this manner the non-oxidizing gas emitted from the end of the pipe will be substantially contained within the interior of the tubing. Thus, a protective atmosphere is established and maintained within the tubing as it moves along to the various following operations. More particularly the discharge end of the pipe is preferably located about ten inches beyond the welding device when making tubing having an inner diameter of less than about one inch.

Since heating the tubing in an oxidizing atmosphere may cause a deleterious corrosion and spalling of the outer surface, it is also desirable to employ a protective atmosphere outside the tubing when it is in a heated condition, particularly when the tubing produced is subsequently to be coated on its outer surface. Thus, as shown in FIGURES 1 and 2, a protective atmosphere can be established and maintained on the outside of the tubing if it is heated and cooled in closed chambers. The resistance heating and annealing devices are contained in a closed chamber in which a non-oxidizing gas in introduced from a suitable reservoir. Similarly, the hot tubing is preferably cooled in a protective atmosphere. Thus, it is preferably cooled in a closed chamber in which a non-oxidizing gas in introduced.

Generally, any gas which is non-oxidizing can be used to protect the interior and exterior of the tubing when it is in a heated condition but preferably the non-oxidizing gas is 20% to 25% reducing in nature. For example, highly satisfactory results can be obtained with a gas which has the following analysis: 10% carbon monoxide, 18% hydrogen, 4.5% carbon dioxide, 1% methane and the balance nitrogen, all proportions by volume. However, substantially pure mixtures of hydrogen, carbon dioxide, carbon monoxide, nitrogen, helium, argon, etc., can also be used.

By means of this invention steel tubing having a plurality of concentric walls which are securely bonded to one another can be uniformly made under commercial conditions. The roll reducing of the outer tube rapidly and economically places it into intimate contact with the adjacent inner tube at a rate generally equal to the speed of a conventional tube-forming mill. In roll reducing the outer tube, there is no necessity of any mandrel within the tube as is often necessary in a swaging operation so that much higher sizing speeds can be obtained. Moreover, the roll reducing cold works and hardens the outer tube to provide a stronger composite tubing. The roll reduced tubing has an exceptionally smooth external surface finish which is not only pleasing to the eye but especially suitable for subsequent coating operations.

The term "abutment" is used herein in its primary meaning, as indicating touching or contacting. Thus, "overlapping edges" of a lap seam, for example, is also comprehended within the phrase "abutting edges" as well as non-overlapping contacting edges, as in a butt joint. As shown in the drawings, the inner tube is preferably formed from a steel strip having scarfed edges which, when the tubing is bent into tubular configuration, forms a lap joint. On the other hand, the abutting edges of the strip forming the outer tube constitute a butt joint. Thus, my invention encompasses making tubing having abutting edges from a metal strip having scarfed edges, the surfaces thereof being non-perpendicular to the major surface of the steel strip, as well as from a steel strip having its edge surface substantially perpendicular to the major surface of the strip.

It is understood that although my invention has been described in connection with certain specific examples thereof, no limitation is intended thereby except as defined in the appended claims.

I claim:

1. A method of making multi-walled steel tubing having concentric walls brazed to one another and a welded outer seam, said method comprising scarfing the edges of a first steel strip, continuously and longitudinally moving said first steel strip while transversely bending it into the shape of a tube with the scarfed edges thereof abutting one another to form a longitudinal seam, continuously and longitudinally moving a second steel strip at generally the speed of the tube formed from the first steel strip while transversely bending the second strip around said tube to form a composite tubing which includes an inner tube and a concentric outer tube, said second steel strip being about 10% to 30% wider than said first steel strip, said outer tube having abutting edges which form a longitudinal seam, continuously longitudinally feeding a strip of brazing material at generally the speed of the composite tubing interjacent said tubes prior to the complete shaping of said second strip, said brazing material being from the group consisting of copper and copper base alloys, progressively introducing a non-oxidizing gas into the interior of said inner tube, electrically welding said abutting edges of said outer tube, then roll-reducing said outer tube so as to elongate it and compress it into intimate circumferential contact with said inner tube, subsequently in a non-oxidizing atmosphere heating the composite tubing to a temperature of about 1850° F. to 2400° F. so as to simultaneously bond the tubes together and form a closed imperforate longitudinal brazed seam on said inner tube, annealing said composite tubing, and thereafter cooling said tubing in a non-oxidizing atmosphere.

2. A method of making multi-walled steel tubing having concentric walls brazed to one another and a welded outer seam, said method comprising continuously and longitudinally moving a first steel strip while transversely bending it into the shape of a tube having abutting edges forming a longitudinal seam, continuously and longitudinally moving a second steel strip at generally the speed of the tube formed from the first steel strip while transversely bending the second strip around said tube to form a composite tubing which includes an inner tube and a concentric outer tube, said second steel strip being about 10% to 30% wider than said first steel strip, said outer tube having abutting edges which form a longitudinal seam, continuously longitudinally introducing a brazing material interjacent said tubes before the outer tube is fully formed and its edges are brought into abutment, progressively introducing a non-oxidizing gas into the interior tube at a point where at least a major proportion of said gas will be retained within the tube, electrically welding said abutting edges of said outer tube so as to form a closed welded seam, thereafter roll-reducing the welded outer tube so as to compress it into intimate circumferential contact with said inner tube, then in a non-oxidizing atmosphere heating the composite tube so as to melt the brazing material to bond said circumferentially contacting tubes together and form an imperforate longitudinal brazed seam on said inner tube, annealing said tubing at a temperature of about 1850° F. to 2400° F., and thereafter cooling said tubing in a non-oxidizing atmosphere.

3. A method of making multi-walled steel tubing having concentric walls brazed to one another and a welded outer seam, said method comprising scarfing the edges of a first steel strip, continuously and longitudinally moving said first steel strip while transversely bending it into the shape of a tube with the scarfed edges thereof abutting one another to form a longitudinal seam, continuously and longitudinally moving a second steel strip at generally the speed of the tube formed from the first steel strip while transversely bending the second strip around said tube to form a composite tubing which includes an inner tube and a concentric outer tube, said second steel strip being about 10% to 30% wider than said first steel strip, said outer tube having abutting edges which form a longitudinal seam, continuously longitudinally feeding a strip of brazing material at generally the speed of the composite tubing interjacent said tubes prior to the complete shaping of said second strip, said brazing material being from the group consisting of copper and copper base alloys, electrically welding said abutting edges of said outer tube, then roll-reducing said outer tube so as to elongate it and compress it into intimate circumferential contact with said inner tube, subsequently heating the composite tubing to a temperature of about 1850° F. to 2400° F. so as to simultaneously bond the tubes together and form a closed imperforate longitudinal brazed seam on said inner tube, annealing said composite tubing, and thereafter cooling said tubing.

4. A method of making multi-walled steel tubing having concentric walls brazed to one another and a welded outer seam, said method comprising continuously and longitudinally moving a first steel strip while transversely bending it into the shape of a tube having abutting edges forming a longitudinal seam, continuously and longitudinally moving a second steel strip at generally the speed of the tube formed from the first steel strip while transversely bending the second strip around said tube to form a composite tubing which includes an inner tube and a concentric outer tube, said second steel strip being about 10% to 30% wider than said first steel strip, said outer tube having abutting edges which form a longitudinal seam, continuously longitudinally introducing a brazing material interjacent said tubes before the outer tube is fully formed and its edges are brought into abutment, electrically welding said abutting edges of said outer tube so as to form a closed welded seam, thereafter roll-reducing the welded outer tube so as to compress it into intimate circumferential contact with said inner tube, the in a non-oxidizing atmosphere heating the composite tube so as to melt the brazing material to bond said circumferentially contacting tubes together and form an imperforate longitudinal brazed seam on said inner tube, annealing said tubing at a temperature of about 1850° F. to 2400° F., and thereafter cooling said tubing.

References Cited in the file of this patent

UNITED STATES PATENTS

| | | |
|---|---|---|
| 9,278 | Prosser | Sept. 21, 1852 |
| 460,921 | Meyer | Oct. 6, 1891 |
| 611,222 | Ries | Sept. 20, 1898 |
| 813,918 | Schmitz | Feb. 27, 1906 |
| 930,927 | Berkstresser | Aug. 10, 1909 |
| 978,864 | Carlisle | Dec. 20, 1910 |
| 1,839,964 | Harvey | Jan. 5, 1932 |
| 2,172,429 | Yates | Sept. 12, 1939 |
| 2,255,472 | Quarnstrom | Sept. 9, 1941 |
| 2,263,714 | Bloomfield et al. | Nov. 25, 1941 |
| 2,280,337 | McKee | Apr. 21, 1942 |
| 2,386,747 | Ris | Oct. 16, 1945 |
| 2,749,866 | Dixon et al. | June 12, 1956 |
| 2,771,669 | Armstrong et al. | Nov. 27, 1956 |
| 2,821,772 | Billetter | Feb. 4, 1958 |

FOREIGN PATENTS

| | | |
|---|---|---|
| 369,982 | Great Britain | Mar. 31, 1932 |
| 519,550 | Great Britain | Mar. 29, 1940 |